ര3,647,808
Patented Mar. 7, 1972

3,647,808
N-SUBSTITUTED DIAMINOPYRIDINES
Eberhard Hofmann, Essen-Bredeney, and Ulrich Holtschmidt, Essen, Germany, assignors to Th. Goldschmidt A.-G., Essen, Germany
No Drawing. Filed Feb. 10, 1970, Ser. No. 10,282
Claims priority, application Germany, Feb. 18, 1969,
P 19 09 065.4
Int. Cl. C07d 31/42
U.S. Cl. 260—296 R                    7 Claims

ABSTRACT OF THE DISCLOSURE

N-substituted diaminopyridines of the formula

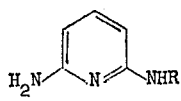

wherein R is alkyl with 8 to 18 carbon atoms or stands for benzyl chlorinated or brominated in 2- and/or 4-position. The novel compounds have pronounced biocidal characteristics.

REFERENCE TO PRIOR DISCLOSURE

This invention has been disclosed in Disclosure Document No. 000010, deposited on Apr. 23, 1969.

FIELD OF THE INVENTION

The invention relates to N-substituted diaminopyridines having biocidal characteristics.

BACKGROUND INFORMATION AND PRIOR ART

The compounds

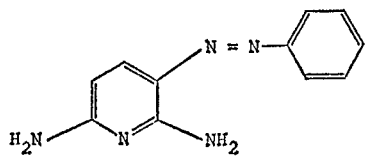

and

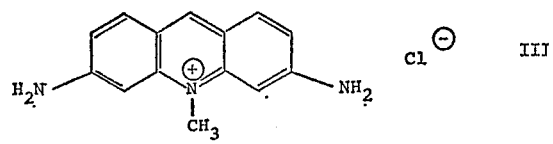

have found limited application as bactericidal agents. The bactericidal activity of these two compounds is, however, rather poor.

SUMMARY OF THE INVENTION

It is a primary object of the present invention to provide novel N-substituted diaminopyridines exhibiting superior biocidal or bactericidal activity.

Briefly, the invention proposes compounds of the general formula

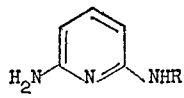

wherein R is alkyl with 8 to 18 carbon atoms or benzyl the latter being chlorinated or brominated in 2- and/or 4-position.

The inventive compounds may form tautomeric or mesomeric structures. Examples are thus the following

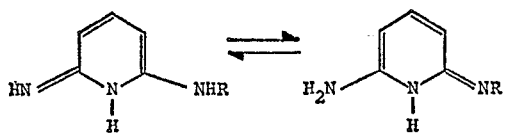

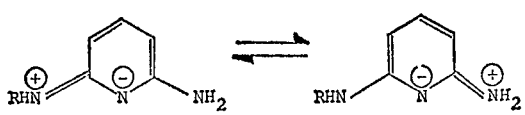

Compounds of this type have not previously been suggested for biocidal purposes. Merely the compounds II and III referred to above, which has a certain similarity in chemical structure, have found limited application as bactericides.

Most of the compounds embraced by the general Formula I are crystalline substances having a slight odor and light color. Their irritation effect on human skin is relatively small. They are hardly soluble in water while their solubility in aqueous acids is slightly better. They are, however, readily soluble in organic solvents, such as alcohol, ether and benzene. Aqueous preparations containing the inventive compounds exhibit but slight foam formation which, of course, is of advantage for many fields of application. The bactericidal properties of the inventive compounds are very pronounced both with gram-positive and also in respect to gram-negative germs. The so-called protein error is surprisingly small with the inventive compounds which, of course, opens up a wide field of application. The term "protein error" indicates to the expert that the biocidal characteristics are negatively affected to a greater or lesser extent in the presence of protein. The inventive compounds may be used as disinfectants, preservatives and algicides. For these purposes the compounds may be used in solid form or dissolved in suitable solvents. Due to their low protein error they are particularly suitable for the disinfection of human and animal skin.

The preparation of the inventive compounds may be effected, for example, by reacting the readily available 2,6-diaminopyridine with alkylhalides or -sulphates whose alkyl groups contain 8 to 18 carbon atoms. Of course, it is feasible to use mixtures of alkyl compounds in which the alkyl groups have different chain lengths. Thus, for example, alkylhalides or -sulphates derived from natural fats or from alcohols of the oxosynthesis may be employed for tthe inventive purposes. Example of alkylhalides are, for example, octylchloride, nonylchloride, decylchloride, dodecylchloride, myristylchloride, palmitylchloride, stearylchloride or mixtures thereof. The corresponding alkylbrodimes are also suitable. In respect to the alkylsulphates, for example, dioctylsulphate, di-i-octylsulphate, didecylsulphate, didodecylsulphate, dimyristylsulphate or distearylsulphate are suitable compounds.

In the event that R of Formula I is a benzyl group which is chlorinated or brominated in 2- and/or 4-position, then the correspondingly ringhalogenated benzylhalides are suitable reaction partners. The benzyl chlorides and -bromides are particularly recommended.

The reactions are advantageously carried out in the presence of basic compounds. Such basic compounds, which serve the purpose to neutralize the acid which is formed during the reaction, are, for example, NaOH, KOH, $Na_2CO_3$, $K_2CO_3$, CaO or the like. Excess amounts of 2,6-diaminopyridine may also act as a basic compound for this purpose.

The reaction for forming the inventive compounds is suitably carried out at temperatures between 60 and 180° C. The preferred temperature range is 100 to 160° C. The reaction components are reacted in the presence of or without solvents. If the reaction is performed in the presence of a solvent then, ethylglycol, chlorobenzene, xylene and the like solvents have proved to be suitable.

Experiments have indicated that particularly favorable biocidal characteristics are possessed by the compound IV

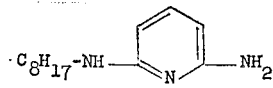

The invention will now be described by several examples it being understood, however, that these examples are given by way of illustration and not by way of limitation and that many changes may be effected without affecting in any way the scope and spirit of the invention as recited in the appended claims.

The following examples describe the preparation of the inventive compounds.

Example I.—Preparation of 2-octylamino-6-amino-pyridine

This experiment was carried out in a 2 liter fourneck flask fitted with stirrer, thermometer and reflux cooler. 440 gr. of 2,6-diaminopyridine and 64 gr. of NaOH in scale form were inserted into the flask. 194 gr. of octylbromide were added to the flask thereafter in dropwise manner. The temperature rose gradually and slowly to 100° C. A vigorous reaction set in under reflux and the temperature rose to 155°–160° C. The reaction mixture is maintained for an additional period of 5 hours at this reaction temperature whereupon the flask was cooled. This resulted in solidification of the reaction mixture. The solid contained in the flask was then dissolved in 1000 ml. of methanol and the solution was filtered. The filtrate was stirred into 5 liters of water whereby a flaky precipitate was formed. This precipitate was removed by filtration and dried under vacuum conditions. Excess amounts of diaminopyridine which had been used in the reaction could be recovered almost quantitatively from the filtrate by concentration.

Yield: 205 gr. $\stackrel{\wedge}{=}$ 92% of the theoretical amount (calculated on octylbromide) of a somewhate crude product. This crude product corresponding to 2 - octylamino-6-aminopyridine contains slight amounts of 2,6 - dioctyl-aminopyridine. For further purification purposes the product was subjected to vacuum distillation.

Boiling point: 0.1–1 mm. Hg: 170–180° C.
Melting point: 45–46° C.

Elementary analysis.—Calculated for $C_{12}H_{23}N_3$ (moleweight 223.3) (percent by weight): C, 70.5; H, 10.5; N, 19.0. Found (percent by weight): C, 70.3; C, 10.4; N, 18.7.

Example 2.—Preparation of 2-dodecylamino-6-amino-pyridine

This experiment was carried out in a 4 liter fourneck flask fitted with stirrer, reflux cooler and thermometer. 873 gr. of 2,6-diaminopyridine and 128 gr. of NaOH were added to the flask in dropwise manner under slow heating to 160° C. A vigorous reaction set in at this temperature. The reaction was permitted to continue for about 8 hours at the indicated temperature whereupon cooling was effected. The residue in the flask was dissolved in 3 liters of methanol and the solution was filtered. The filtrate was stirred into about 10 liters of water. A flaky precipitate was formed which was removed by filtration and dried under vacuum conditions.

Yield: 506 gr. $\stackrel{\wedge}{=}$ 91% of the theoretical amount (calculated on dodecylbromide) of 2-dodecylamino-6-amino-pyridine. The product was subjected to vacuum distallation for further purification purposes.

Boiling point: 0.1 mm. Hg: 190–195° C.
Melting point: 62–63° C.

Elementary analysis.—Calculated for $C_{17}H_{31}N_3$ (moleweight 277.5) (percent by weight): C, 73.6; H, 11.3; N, 15.2. Found (percent by weight): C, 73.2; H, 11.6; N, 15.0.

Example 3.—Preparation of 2-(p-chloro)-benzylamino-6-amino-pyridine

This experiment was carried out in a 2 liter fourneck flask fitted with stirrer, reflux cooler and thermometer. 440 gr. of 2,6-diaminopyridine, 64 gr. of NaOH in scale form and 161 gr. of p-chlorobenzylchloride were supplied to the flask and the mixture was slowly heated to 150° C. The reaction mixture was stirred for about 10 hours at this temperature. The flask was then cooled and the flask contents were dissolved in 1000 ml. of methanol. The solution was filtered to remove inorganic residues. The filtrate was stirred into 5 liters of water whereby a flaky precipitate was formed which was removed by filtration and dried.

Yield: 205 gr. $\stackrel{\wedge}{=}$ 87% of the theoretical amount (calculated on chlorobenzylchloride). For further purification purposes the product was distilled under vacuum conditions.

Boiling point: 0.1 mm. Hg: 170–180° C.
Melting point: 73–74° C.

Elementary analysis.—Calculated for $C_{12}H_{12}N_3Cl$ (moleweight 234) (percent by weight): C, 61.6; H, 5.2; N, 17.9; Cl, 15.2. Found (percent by weight): C, 61.2; H, 5.4; N, 18.2; Cl. 15.2.

Example 4.—Preparation of

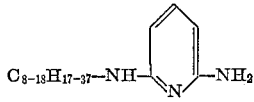

For reaction with 2,6-diaminopyridine, an alkylchloride was used whose chain length distribution was as follows:

| | Percent |
|---|---|
| $C_8$ | 0.2 |
| $C_{10}$ | 1.8 |
| $C_{12}$ | 60.8 |
| $C_{14}$ | 30.3 |
| $C_{16}$ | 5.2 |
| $C_{18}$ | 1.7 |

The average moleweight of this compound is 217.

217 gr. of this mixed-chain alkylchloride were reacted with 440 gr. of 2,6-diaminopyridine and 60 gr. of NaOH and subsequently processed in a manner analogous to that described in Example 2. Merely the reaction time was different. It was thus increased to 24 hours. After vacuum distillation (boiling point 0.1 to 1 mm. Hg: 170–200° C.) a slightly colored amorphous solid substance was obtained which was soluble in diluted HCl and also in diluted acetic acid in an amount of approximately 0.1%.

Yield: 210 gr. $\stackrel{\wedge}{=}$ 72% of the theoretical amount (calculated on alkylchloride).

The excellent bactericidal characteristics of the inventive compounds, particularly in respect to Gramnegative bacteria are demonstrated in the subsequent suspenion test.

BACTERIOLOGICAL INVESTIGATIONS

Suspension test with 2-dodecylamino-6-amino-pyridine

By adding acetic acid, a 0.1% solution of 2-dodecyla-mino-6-amino-pyridine was prepared whose pH-value was 2.9. In diluting the 0.1% solution down to 0.0005% as indicated in the following table, the pH-value, of course, rises to higher values which corespond to the physiological requirements. As is customary with such substances, a certain turbidity then occurs so that the systems in which the active substance is highly diluted are rather dispersions than solutions.

+ = Bacteria growth.
− = No bacteria growth.

| Test species | Concentration, percent | Action time, minutes | | | | | |
|---|---|---|---|---|---|---|---|
| | | 1 | 2 | 5 | 10 | 20 | 30 |
| *Staphylococcus aureus* | 0.1 | − | − | − | − | − | − |
| | 0.05 | − | − | − | − | − | − |
| | 0.01 | + | − | − | − | − | − |
| | 0.005 | + | + | − | − | − | − |
| | 0.001 | + | + | + | + | − | − |
| | 0.0005 | + | + | + | + | − | − |
| *Pseudomonas aeruginosa* | 0.1 | − | − | − | − | − | − |
| | 0.05 | − | − | − | − | − | − |
| | 0.01 | − | − | − | − | − | − |
| | 0.005 | + | − | − | − | − | − |
| | 0.001 | + | + | + | + | − | − |
| *Proteus vulgaris* | 0.1 | − | − | − | − | − | − |
| | 0.05 | + | + | − | − | − | − |
| | 0.01 | + | + | + | + | − | − |
| | 0.005 | + | + | + | + | + | − |
| | 0.001 | + | + | + | + | + | + |
| *Escherichia coli* | 0.1 | − | − | − | − | − | − |
| | 0.05 | − | − | − | − | − | − |
| | 0.05 | + | − | − | − | − | − |
| | 0.005 | + | + | − | − | − | − |
| | 0.001 | + | + | + | + | + | − |

What is claimed is:

1. A compound of the general formula:

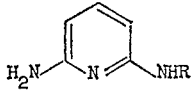

wherein R is alkyl with 8 to 18 carbon atoms or benzyl which is chlorinated or brominated in 2- and/or 4-position.

2. A compound system corresponding to

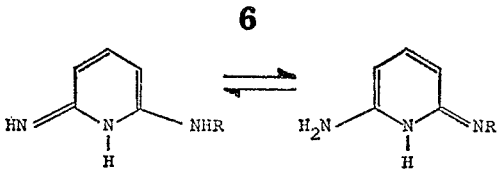

wherein R is alkyl with 8 to 18 carbon atoms or benzyl which is chlorinated or brominated in 2- and/or 4-position.

3. A compound system according to

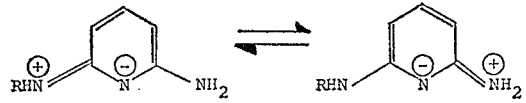

wherein R is alkyl with 8 to 18 carbon atoms or benzyl which is chlorinated in 2- and/or 4-position.

4. The compound of the formula:

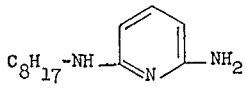

5. 2-dodecylamino-6-amino-pyridine.
6. 2-(p-chloro-)benzylamino-6-amino-pyridine.
7. A compound of the group having the following structure:

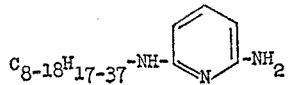

References Cited

UNITED STATES PATENTS 3,290,040  8/1965  Lange et al. _____ 260—296

ALAN L. ROTMAN, Primary Examiner

U.S. Cl. X.R.

424—263